(12) United States Patent
Yoshida et al.

(10) Patent No.: US 11,417,319 B2
(45) Date of Patent: Aug. 16, 2022

(54) DIALOGUE SYSTEM, DIALOGUE METHOD, AND STORAGE MEDIUM

(71) Applicant: KABUSHIKI KAISHA TOSHIBA, Tokyo (JP)

(72) Inventors: Takami Yoshida, Kawasaki Kanagawa (JP); Kenji Iwata, Tokyo (JP); Yuka Kobayashi, Seto Aichi (JP); Masami Akamine, Yokosuka Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/899,835

(22) Filed: Feb. 20, 2018

(65) Prior Publication Data

US 2019/0088252 A1 Mar. 21, 2019

(30) Foreign Application Priority Data

Sep. 21, 2017 (JP) .............................. JP2017-180998

(51) Int. Cl.
*G10L 15/07* (2013.01)
*G10L 15/22* (2006.01)
(Continued)

(52) U.S. Cl.
CPC .............. *G10L 15/07* (2013.01); *G06F 3/167* (2013.01); *G06F 16/90332* (2019.01);
(Continued)

(58) Field of Classification Search
CPC ......... G10L 15/07; G10L 15/22; G06F 40/35; G06F 40/226; G06F 40/279; G06F 16/90332
See application file for complete search history.

(56) References Cited

U.S. PATENT DOCUMENTS

| | | | | |
|---|---|---|---|---|
| 5,473,705 A | * | 12/1995 | Abe | ....................... G09B 21/00 |
| | | | | 382/229 |
| 5,521,816 A | * | 5/1996 | Roche | ................... G06F 40/232 |
| | | | | 704/9 |

(Continued)

FOREIGN PATENT DOCUMENTS

| | | | | | |
|---|---|---|---|---|---|
| CN | 101652808 A | * | 2/2010 | ............. | G10H 1/368 |
| CN | 104933030 A | * | 9/2015 | ......... | B60R 16/0373 |

(Continued)

OTHER PUBLICATIONS

Claveau, Vincent, and Marie-Claude L'Homme. "Discovering specific semantic relationships between nouns and verbs in a specialized French corpus." Proceedings of CompuTerm 2004: 3rd International Workshop on Computational Terminology. (Year: 2004).*

*Primary Examiner* — Daniel C Washburn
*Assistant Examiner* — Oluwadamilola M Ogunbiyi
(74) *Attorney, Agent, or Firm* — Knobbe, Martens, Olson & Bear, LLP

(57) ABSTRACT

According to one embodiment, a dialogue system includes a setting apparatus and a processing apparatus. The setting apparatus sets in advance a plurality of words that are in impossible combination relationships to each other. The processing apparatus acquires speech of a user, and when a speech recognition result of an object included in the speech includes a word combination included in the plurality of words that are in impossible combination relationships to each other, output a notification to the user that processing of the object cannot be carried out.

12 Claims, 6 Drawing Sheets

(51) Int. Cl.
  *G06F 3/16*      (2006.01)
  *G06F 16/9032*   (2019.01)
  *G06F 40/226*    (2020.01)
  *G06F 40/279*    (2020.01)
  *G06F 40/35*     (2020.01)

(52) U.S. Cl.
  CPC .......... *G06F 40/226* (2020.01); *G06F 40/279* (2020.01); *G06F 40/35* (2020.01); *G10L 15/22* (2013.01); *G10L 2015/223* (2013.01)

(56) References Cited

U.S. PATENT DOCUMENTS

| | | | | |
|---|---|---|---|---|
| 5,734,749 | A * | 3/1998 | Yamada | G06V 30/373 382/229 |
| 6,173,253 | B1 * | 1/2001 | Abe | G06F 40/247 704/10 |
| 6,327,566 | B1 * | 12/2001 | Vanbuskirk | G10L 15/1822 704/231 |
| 6,505,155 | B1 * | 1/2003 | Vanbuskirk | G10L 15/22 704/246 |
| 7,752,293 | B1 * | 7/2010 | Bishop, Jr. | H04L 41/0226 709/223 |
| 8,165,886 | B1 * | 4/2012 | Gagnon | G10L 15/19 704/275 |
| 8,370,146 | B1 * | 2/2013 | Schalkwyk | G10L 15/1815 704/235 |
| 8,452,451 | B1 * | 5/2013 | Francis, Jr. | B25J 9/1658 700/245 |
| 9,384,731 | B2 * | 7/2016 | Tjalve | G10L 15/19 |
| 2002/0046398 | A1 * | 4/2002 | Osborne | G06F 9/45512 717/126 |
| 2002/0065654 | A1 * | 5/2002 | Grant | G10L 15/193 704/235 |
| 2003/0225578 | A1 * | 12/2003 | Kahn | G10L 15/26 704/E15.045 |
| 2004/0162729 | A1 * | 8/2004 | Strong | G10L 15/1822 704/259 |
| 2004/0242998 | A1 * | 12/2004 | Pan | G10L 15/22 600/437 |
| 2004/0260562 | A1 * | 12/2004 | Kujirai | G01C 21/3608 704/275 |
| 2005/0027507 | A1 * | 2/2005 | Patrudu | G06F 40/30 704/1 |
| 2006/0059460 | A1 * | 3/2006 | Phillips | G06Q 10/06316 717/109 |
| 2006/0089834 | A1 * | 4/2006 | Mowatt | G10L 15/22 704/253 |
| 2007/0240231 | A1 * | 10/2007 | Haswarey | G06F 21/6218 726/28 |
| 2007/0288239 | A1 * | 12/2007 | Russell | G10L 15/193 704/257 |
| 2008/0082922 | A1 * | 4/2008 | Biniak | H04N 21/252 348/E7.071 |
| 2008/0134038 | A1 * | 6/2008 | Oh | G06F 16/9535 704/E15.045 |
| 2009/0012789 | A1 * | 1/2009 | Gaudet | G06F 40/274 704/251 |
| 2009/0024391 | A1 * | 1/2009 | Grant | G10L 15/193 704/257 |
| 2009/0089057 | A1 * | 4/2009 | Batot | G09B 19/06 704/251 |
| 2010/0049713 | A1 * | 2/2010 | Ichino | G06F 40/279 707/758 |
| 2010/0286984 | A1 * | 11/2010 | Wandinger | G10L 15/04 704/251 |
| 2011/0029869 | A1 * | 2/2011 | McLennan | G06F 3/0236 715/702 |
| 2012/0303371 | A1 * | 11/2012 | Labsky | G10L 13/08 704/260 |
| 2014/0032652 | A1 * | 1/2014 | Hu | G06F 16/957 709/203 |
| 2014/0108013 | A1 * | 4/2014 | Di Cristo | G06F 17/273 704/254 |
| 2014/0163975 | A1 * | 6/2014 | Lee | G10L 15/01 704/231 |
| 2015/0256873 | A1 * | 9/2015 | Klein | H04N 21/26283 725/39 |
| 2016/0133253 | A1 * | 5/2016 | Braho | G10L 15/065 704/251 |
| 2016/0163314 | A1 * | 6/2016 | Fujii | G10L 13/027 704/275 |
| 2016/0188574 | A1 * | 6/2016 | Homma | G06N 20/00 704/9 |
| 2017/0075506 | A1 * | 3/2017 | O'Doherty | G06F 9/44 |
| 2017/0075653 | A1 * | 3/2017 | Dawidowsky | G06F 3/017 |
| 2017/0083198 | A1 * | 3/2017 | Raskin | G06F 3/038 |
| 2017/0229116 | A1 * | 8/2017 | Melnikov | G10L 15/1815 |
| 2018/0011835 | A1 * | 1/2018 | Arbault | G06F 40/30 |
| 2018/0234550 | A1 * | 8/2018 | Lifson | H04L 69/08 |
| 2018/0304906 | A1 * | 10/2018 | Powell | B60R 16/037 |
| 2018/0341760 | A1 * | 11/2018 | Frempong | H04L 63/102 |

FOREIGN PATENT DOCUMENTS

| | | | |
|---|---|---|---|
| DE | 19646634 A1 * | 5/1998 | ......... B60R 16/0373 |
| JP | 2006-119625 A | 5/2006 | |
| JP | 3795350 B2 | 7/2006 | |
| JP | 2019-012228 A | 1/2019 | |

\* cited by examiner

| | Find | Reserve | Take |
|---|---|---|---|
| Cafe | ○ | × | × |
| Restaurant | ○ | ○ | × |
| Home-delivery pizza | ○ | ○ | ○ |

DIALOGUE SYSTEM, DIALOGUE METHOD, AND STORAGE MEDIUM

CROSS-REFERENCE TO RELATED APPLICATIONS

This application is based upon and claims the benefit of priority from Japanese Patent Application No. 2017-180998, filed Sep. 21, 2017, the entire contents of which are incorporated herein by reference.

FIELD

Embodiments described herein relate generally to a dialogue system, a dialogue method, and storage medium.

BACKGROUND

In recent years, regarding guidance on merchandise or services, it has become possible to carry out an automated response according to a scenario. Although it is desirable for the users that various questions be enabled, in the provision of a dialogue system, a question can be put only in a setting of limited situations in many cases. On the other hand, diverse systems are prepared, and hence the response contents of the system side are not transmitted to the user side, thus frequent confirmation is required in some cases.

DETAILED DESCRIPTION

In general, in the case where a method by which a plurality of alternatives are presented from the system side, and the user selects an applicable item is employed, particularly when the user is urged to input an applicable item by using a number, the answer of the user is definite. When the contents which the system cannot dispose of are input (when the contents are not applicable), it is sufficient if that the input of the user is not applicable to the system processing is told to the user as it is. On the other hand, when it is intended to accept a free utterance to respond to the request of the user, the expressions of the user can become diverse.

Further, there is also a case where the response of the system is not definite. For example, a case where a request "Get a cafe reservation," is made of a system providing store finder service is assumed. There is a case where although the store finder system concerned has the reservation function, the "cafe" desired by the user is a shop not employing a reservation system. In this case, if the system answers "Not sure", "Impossible", and the like, it becomes unclear whether the system concerned cannot make a reservation or the "cafe" desired by the user cannot accept a reservation or the "cafe" is not found. Furthermore, when the speech dialogue system is utilized, it is not possible to convey the meaning to the user whether recognition of the speech recognition itself does not work well or the intention of the utterance of the user is not comprehended or the system means that although recognition is correctly carried out, the designated function is not provided. As a result, there is sometimes a case where input has to be carried out repeatedly while the expression is changed, thereby causing an excessive load on the user. In the dialogue system according to this embodiment, information on the state where the system is unable to cope with the input is fed back to the user, whereby the excessive load on the user is lightened.

In general, according to one embodiment, a dialogue system includes a setting apparatus and a processing apparatus. The setting apparatus sets in advance a plurality of words that are in impossible combination relationships to each other. The processing apparatus acquires a speech of a user, and when a speech recognition result of an object included in the speech includes a word combination included in the plurality of words that are in impossible combination relationships to each other, output a notification to the user that processing of the object cannot be carried out.

Various embodiments will be described hereinafter with reference to the accompanying drawings.

Figures 1, 2:
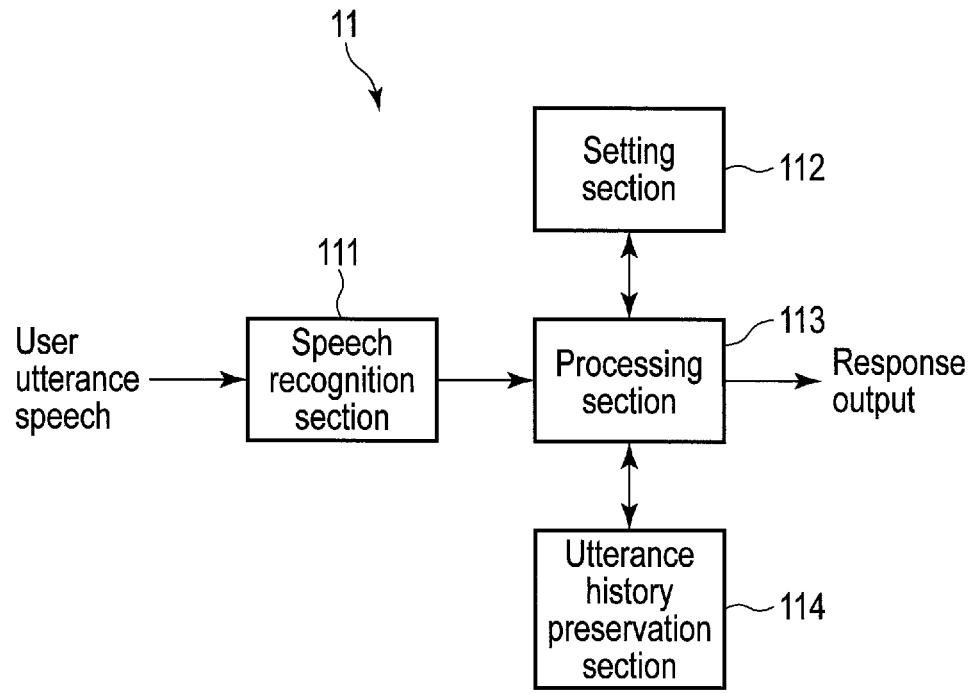
FIG. 1 is a block diagram schematically showing a dialogue system according to an embodiment.
FIG. 2 is a view showing possible/impossible relationships between a plurality of predicates and a plurality of objects registered in a registration section of the dialogue system according to the embodiment.

In the embodiment, utilization of the system for, for example, store guidance is assumed. Store guidance implies assisting the user to find an agreeable store from among a plurality of stores, to confirm a place, to obtain information on the state of congestion or to obtain information on guidance or the like of reservation. FIG. 1 is a block diagram showing the configuration of the dialogue system according to this embodiment. The dialogue system 11 shown in FIG. 1 is provided with a speech recognition section 111, setting section 112, processing section 113, and utterance history preservation section 114.

The speech recognition section 111 recognizes a speech of the user from the utterance of the user acquired through a microphone. The setting section 112 sets whether or not a combination of a plurality of words can be processed. More specifically, the setting section 112 sets possible/impossible combination relationships between a plurality of predicates and a plurality of objects. For example, the relationships may be tabulated as shown in FIG. 2. Hereinafter, although a description will be given by taking a case where a list in which matters that cannot be carried out are summarized is prepared in advance as an example, the conceivable case is not limited to this. Keyword spotting in which for example, a phoneme of an utterance of the user is utilized to collate a speech-recognized word with a list may be used. A predicate and object may be identified by the utterance of the user through comparison processing based on a statistical model such as Recurrent Neural Networks (RNN).

The processing section 113 determines, with respect to a predicate and object included in the speech-recognized utterance of the user, whether the relationship between the two is possible or impossible by referring to combinations of words set by the setting section 112. When a predetermined function of the dialogue system cannot be utilized with respect to a combination of a predicate and object which the user intends to use, "It cannot be processed (processing impossible)," is output. Here, the predetermined function implies, as shown in, for example, FIG. 2, in the relationship between cafe (object) and reserve (predicate), "reserve". For example, in the case of a function "display a map", "map display (object)" or the like is allowed. When a function constituted of a combination of a predicate and object is available, processing is executed on the basis of a predetermined scenario, and the response information items are output. The utterance history preservation section 114 preserves therein words recognized by speech recognition under a predetermined condition, and outputs a preserved word according to a request from the processing section 113.

When the system cannot respond to the first several utterances of the user, it is desirable that the system should answer "The system is unable to respond". This is because even when the system presents, for example, "Impossible," there is a case where the user cannot determine whether the system has failed in speech recognition or the system says that the system has been able to correctly carry out recognition, but has no function concerned. Furthermore, it is more desirable that output control in which the tone of the voice of the user, speed of the speech of the user, countenance of the user, and the like are taken into consideration be carried out. There is a case where understanding of the user about the problem that the system is unable to respond to the request of the user can be gained by controlling the rhythm of the sentence, and tone or speed of the system response.

First Example

Figure 3:
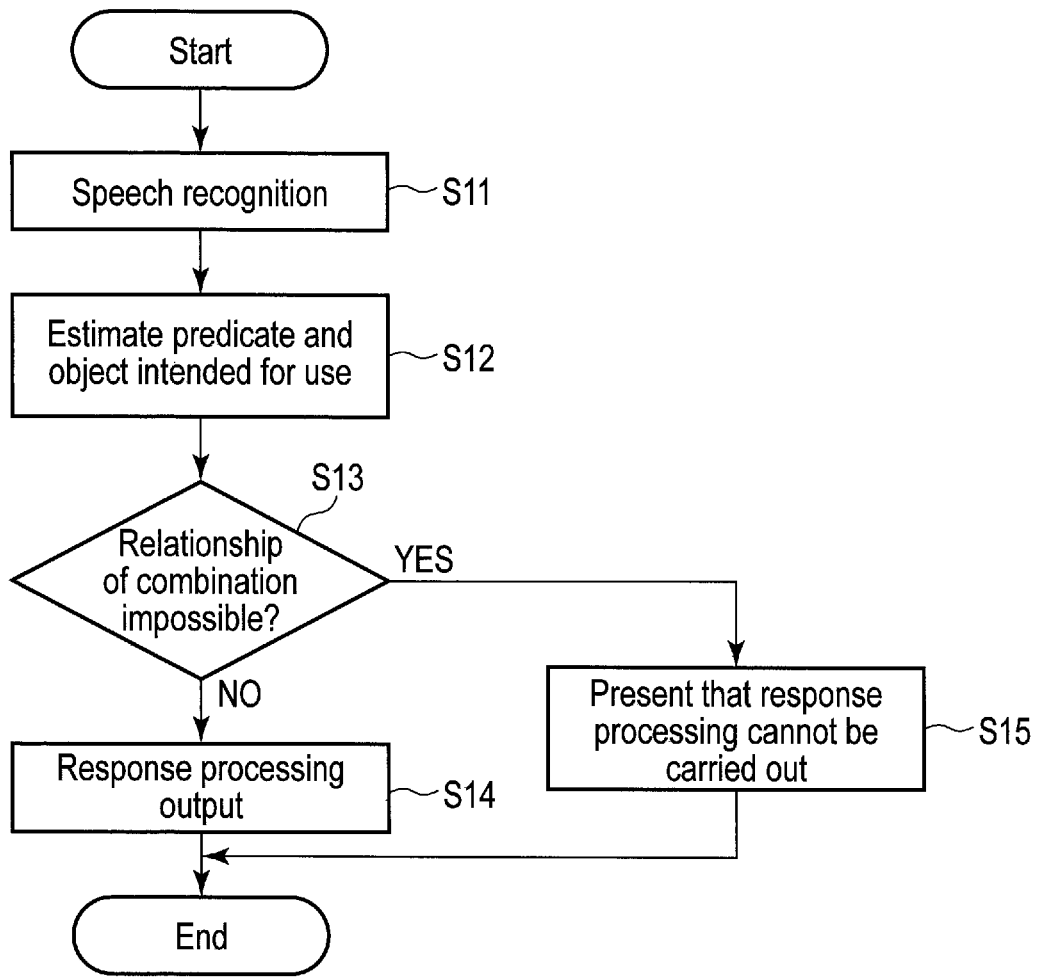
FIG. 3 is a flowchart showing a flow of processing of a first example (basic).

A first example will be described below with reference to the flowchart shown in FIG. 3. First, a speech of the user is acquired, and then speech recognition is carried out (step S11). Next, a predicate and object which the user intends to use are estimated from a recognition result (step S12). Next, by referring to combinations of predicates and objects previously set in the setting section 112, it is verified whether or not the relationship between the predicate and object is impossible (step S13). Here, when the processing is not impossible (NO), response processing is executed, and the result is output (step S14), whereby a series of processing is terminated. Further, when the processing is impossible (YES), it is presented to the user that the combination intended for use by the user cannot be utilized (impossible to utilize) (step S15), and the series of processing is terminated.

FIG. 2 shows combination relationships of a case where utilization of the system for store guidance is assumed. More specifically, "find" "a cafe", and "find/reserve" "a restaurant" can correspond to each other, but "reserve" "a cafe" cannot correspond to each other. For example, it is assumed that the user has requested "Reserve a cafe". At this time, the system side presents an impossibility response saying "A cafe cannot be reserved" on the basis of the relationship shown in the table. Thereby, it is possible for the user to grasp that although the intended request of the user has been recognized, the request contents has been inappropriate.

It should be noticed that in this example, regarding the request "Reserve a cafe", although "a cafe" and "Reserve" have been separated from each other, a combination of three or more words may also be utilized. In this case, three or more words obtained from the utterance of the user are utilized as an aggregate. For example, when a request "Turn on the power to the TV set" is made, the request may be divided into "the TV set", "the power", and "Turn on".

Second Example

Figure 4:
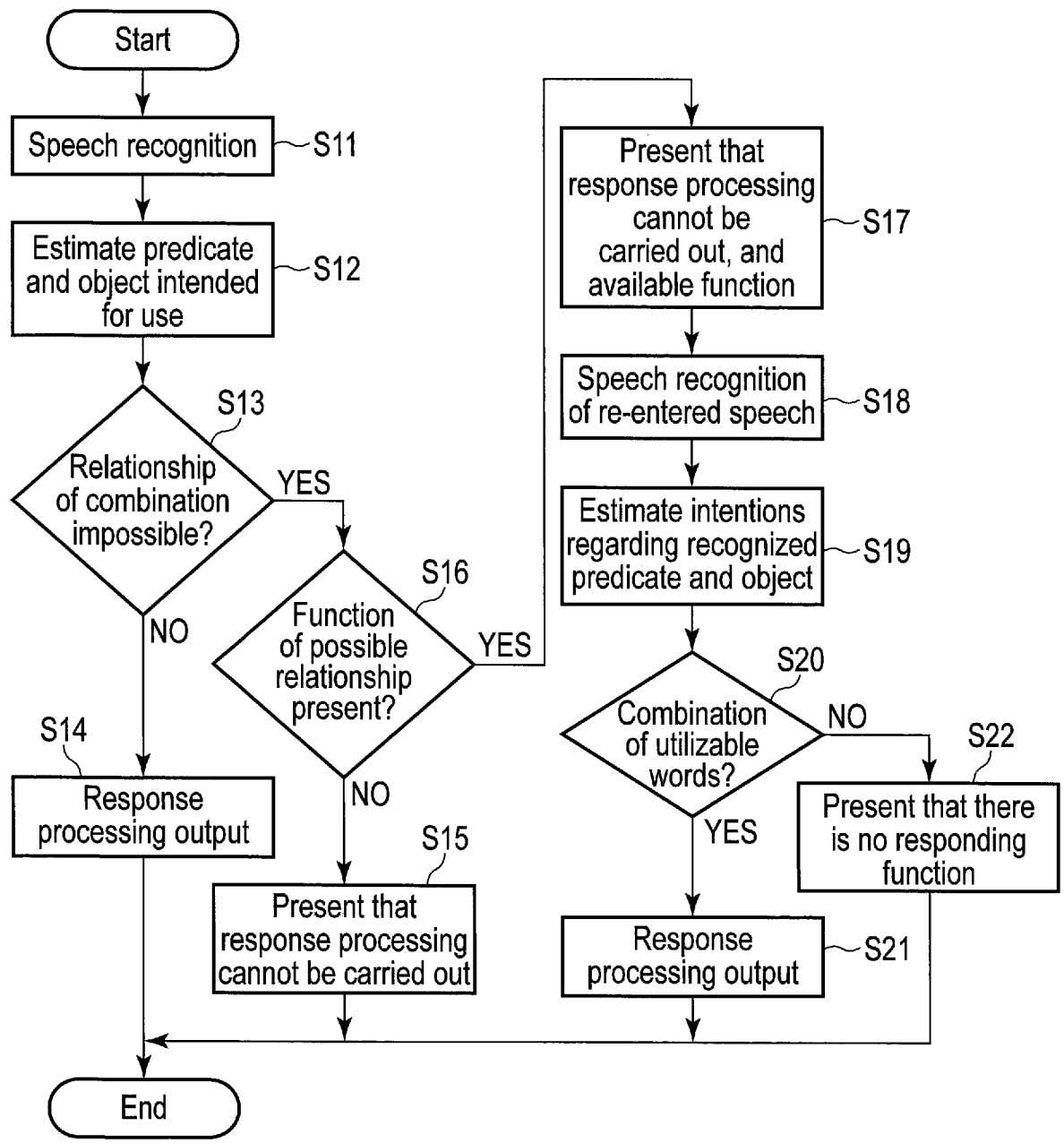
FIG. 4 is a flowchart showing a flow of processing of a second example (impossible word plus possible word presentation).

A second example will be described below with reference to the flowchart shown in FIG. 4. It should be noted that in FIG. 4, steps identical to those in FIG. 3 are denoted by reference symbols identical to FIG. 3, and only points different from FIG. 3 will be described here.

In this example, when, in step S13 in the first example, the relationship between a speech-recognized predicate and object is impossible, a function of a possible relationship is extracted (step S16). Here, when there is no function of the possible relationship, it is presented that the response processing cannot be carried out, and a series of processing is terminated (step S15). When the function of the possible relationship is provided, it is presented that the response processing cannot be carried out and, at the same time, an available function is also presented (step S17). When the user receives the presentation, and carries out re-entry, the re-entered speech is subjected to speech recognition (step S18). With respect to the recognition result, re-estimation of the intentions regarding the predicate and object is carried out (step S19). Here, the system 11 verifies whether or not the re-entered speech is a combination of utilizable words (step S20) and, when the speech is a combination of utilizable words, the responding function is processed and output (step S21), and a series of processing is terminated. Further, when the speech is not a combination of utilizable words, it is presented that there is no responding function ("impossible")(step S22), and a series of processing is terminated.

In the case of FIG. 2, regarding the user's request "Reserve a cafe", together with an impossibility answer, "Cafe cannot be reserved", a response is made with a possible function "A restaurant or home-delivery pizza can be reserved if you like, and a cafe can be found". Conversely, when the user utters "Reserve a restaurant", it is advisable to explicitly state that processing is to be carried out by using an available function such as "Then a restaurant is reserved". As described above, according to this embodiment, even when the user makes an impossible request, the system side introduces an available function to the user, thus it becomes possible for the user to select and specify an available function at the time of the next request.

It should be noted that, in the case of, for example, store guidance, there is sometimes a case where the number of objective stores become very large. In this case, the user who manages the system may provide the priority order for each of the stores, and the stores may be presented in the order from the stores with higher priority as the available function. Further, a classification in which stores similar to each other in commodities or services which are handled by the stores are classified as a group may be separately made or presentation of substitutable functions may be carried out by using a predetermined regulation such as a regulation associated with distances between stores and the like.

Third Example

Figure 5:
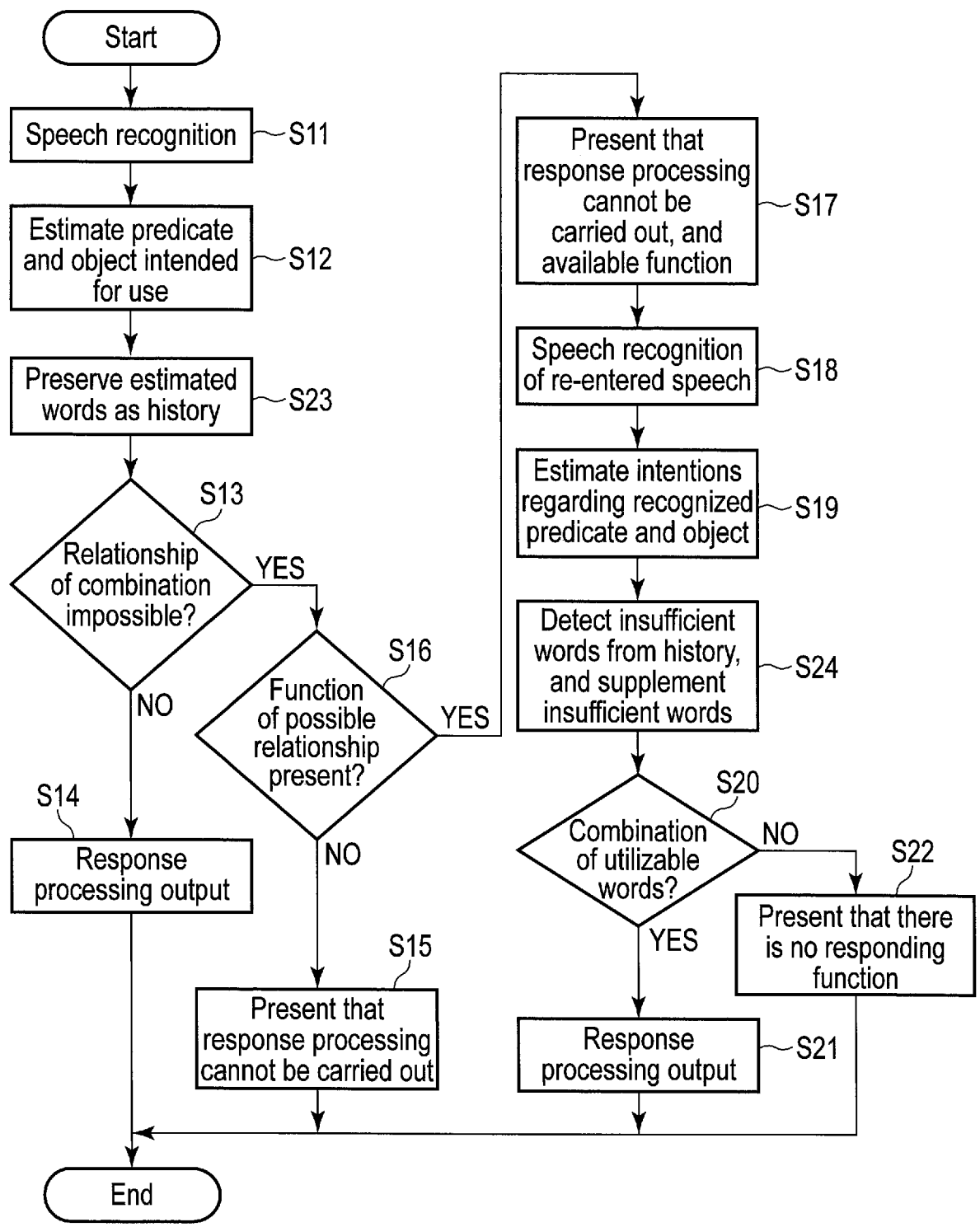
FIG. 5 is a flowchart showing a flow of processing of a third example (word supplement from word history).

A third example will be described below with reference to the flowchart shown in FIG. 5. It should be noted that in FIG. 5, steps identical to those in FIG. 4 are denoted by reference symbols identical to FIG. 4, and points different from FIG. 4 will be described here.

In this example, after estimation of the intention is carried out in step S12 in the second example, the estimated words are preserved as the history (step S23). Further, when there is a shortage of words with respect to the predicates or objects in the utterance of the user, the word history is referred to. More specifically, words which could have been acquired at this point in time are deleted from the utterance of the user latest in terms of time, and the resultant is extracted as insufficient words (step S24). The request contents are recognized, and the response processing is executed (step S21).

For example, in the example described above, a case where after the possible function "A restaurant or home-delivery pizza can be reserved if you like, and a cafe can be found" is introduced, the user has uttered "Then, I would like to have a restaurant," is assumed. A comparison is made between the word history and the utterance of the user, whereby the omitted word "reserved" is supplemented. As described above, in the dialogue, even when part of the words are omitted, the omitted words are detected from the history, whereby the omitted words can be supplemented.

Fourth Example

Figure 6:
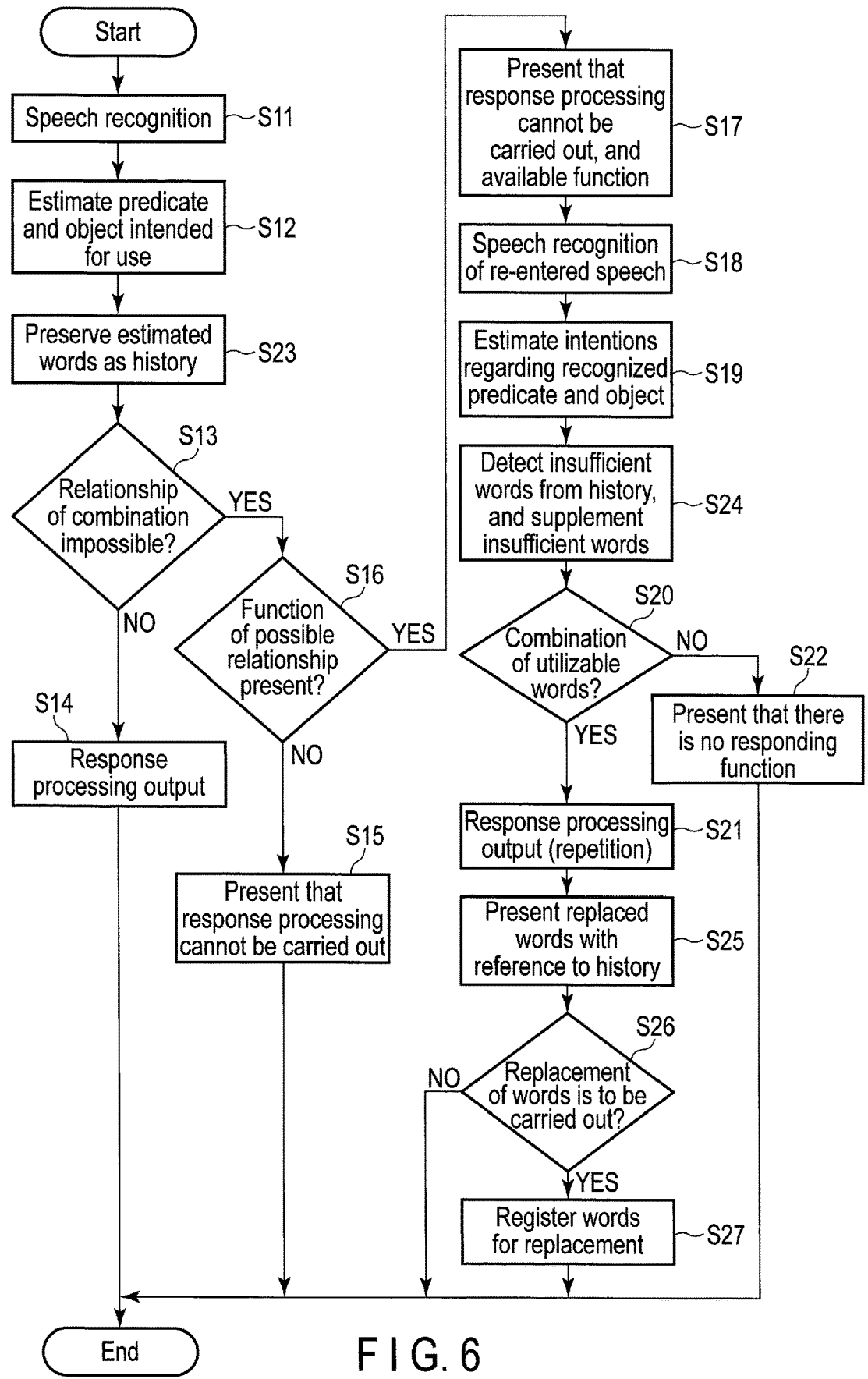
FIG. 6 is a flowchart showing a flow of processing of a fourth example (word replacement from word history).
Figure 7:
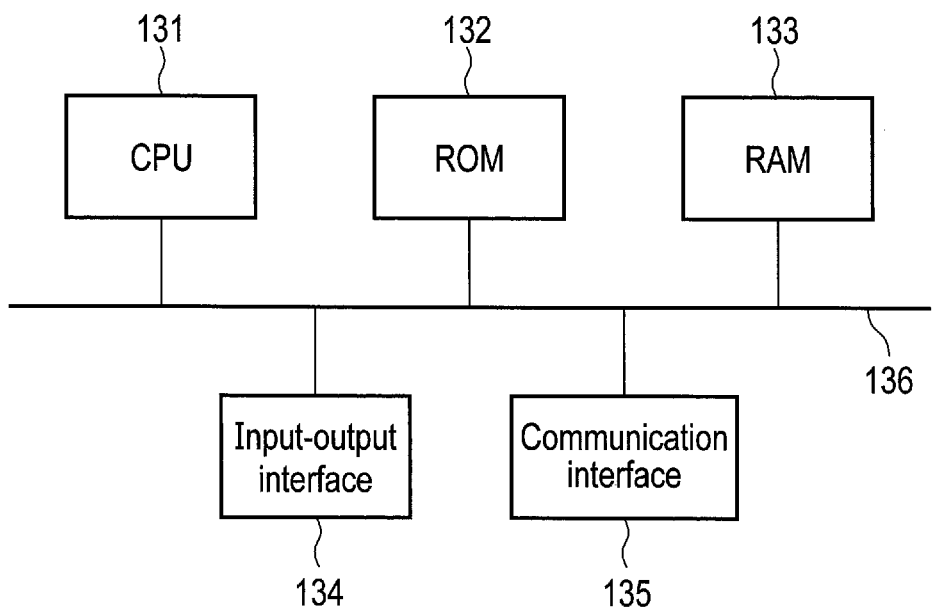
FIG. 7 is a block diagram showing a basic configuration of a computer device applicable to the dialogue system according to the embodiment.

A fourth example will be described below with reference to the flowchart shown in FIG. 6. It should be noted that in FIG. 6, steps identical to those in FIG. 4 and FIG. 5 are denoted by reference symbols identical to FIG. 4 and FIG. 5, and points different from FIG. 4 and FIG. 5 will be described.

In this example, as in the case of the third example, after intention estimation is carried out in step S12, the estimated words are preserved as the history (step S23). Further, when words of utilizable functions are selected in step S20, the request contents are recognized, and after response processing is executed (step S21), used words associated with replacement are presented with reference to the history of words (step S25). Here, replacement implies replacement of words having meanings similar to the words set in advance in the setting section 112 such as objects, predicates and the like for these words. Although a description will be given later, expressing a word "reserve" by another word "keep" is a paraphrase carried out by the user. When there is no instruction to replace words to be used in the future (step S26), the system 11 terminates a series of processing as it is. If there is a replacement instruction (step S26), the system 11 sets words used for replacement (step S27), and terminates a series of processing. It should be noted that when the number of times of replacement for specific words and specific phrases is greater than or equal to a predetermined number of times, the replaced words may be added to the setting section 112. For example, the user may set a predetermined threshold, and when the number of replacement has become greater than or equal to the predetermined threshold, the system automatically carries out replacement to thereby continue response processing. Further, the processing section 113 may repeat at least part of the utterance of the user to thereby determine similar words similar to the words of the objective combination and newly set the similar words in the setting section 112. As the similar words, a collection of general similar words may be used. For example, a thesaurus is prepared separately, and the thesaurus is collated with a word included in the utterance of the user. For example, words similar to the words set by the setting section 112 may be presented in step S25, and it may be confirmed by the user whether or not the words are to be replaced.

For example, when the user makes a request by saying "I would like to take a restaurant tonight," the system side makes a response by saying "A restaurant cannot be taken. It is possible to find a restaurant and reserve the restaurant". Upon this, when the user makes a response by saying "Now I remember, please make a reservation", the system side repeats the response of the user by saying "Then, a restaurant will be reserved," as the response processing. At this time, the system determines that the expression of the user "take" is a paraphrase of reservation, and puts a question to the user by saying "Do you register the word 'take' as a paraphrase of 'reserve' in the case of a restaurant?". When the user permits the registration, the system registers the replacement word in advance, and can advance processing according to the user's way of request at the time of next reservation.

As another example, when the user makes a request by saying "I would like to get home delivery of buckwheat noodles," the system makes a response by saying "Home delivery of buckwheat noodle is not available, but home delivery of pizza can be ordered." In this case, the user can grasp the available alternative on the spot, and hence it becomes possible for the user to cause processing securely fulfilling the user's request to be executed in the next dialogue. Further, when a response is made to a request "Deliver pizza to me" by saying "Pizza cannot be delivered, but home delivery of pizza can be ordered," if a request is re-entered by saying "Please order home delivery of pizza," it becomes possible to make a contribution to the next dialogue by informing the user of a notification, i.e., by saying "The word 'deliver' is now registered as a paraphrase expression of 'home delivery'".

It should be noticed that the dialogue system 11 of the embodiment can be realized by using, for example, a general-purpose computer device as basic hardware. That is, the speech recognition section 111, setting section 112, processing section 113, and utterance history preservation section 114 can be realized by causing a processor incorporated in the above-mentioned computer device to execute the programs. The computer device applicable to such a dialogue system is provided with a control device such as a Central Processing Unit (CPU) 131 or the like, storage devices such as a Read Only Memory (ROM) 132, Random Access Memory (RAM) 133, and the like, input-output interface 134 to which microphones, operation input device, display device, and the like are connected, communication interface 135 connected to a network and configured to carry out communication, and bus 136 connecting all the parts to each other. The dialogue system may be realized by installing the above programs in advance in the computer device or may be realized by storing the programs in a storage device such as a CD-ROM or the like or by distributing the programs through the network, and appropriately installing the programs in the computer device. Further, a dialogue log storage section, scenario storage section, dictionary storage section, and intention storage section can be realized by appropriately utilizing storage mediums incorporated in or externally attached to the above computer device such as a memory, hard disk, CD-R, CD-RW, DVD-RAM, DVD-R, and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A dialogue system comprising:
a setting apparatus configured to set in advance a plurality of words that are in impossible combination relationships to each other;
a recognition apparatus configured to acquire an utterance of the user, and subject the utterance to speech recognition;
a processing apparatus configured to acquire recognition result of the user's utterance, and when a speech recognition result of an object included in the speech includes a word combination included in the plurality of words that are in impossible combination relationships to each other, output a notification to the user that processing of the object cannot be carried out; and
a preservation apparatus configured to preserve therein an utterance history of utterances of the user, wherein
the processing apparatus replaces at least a portion of the word combination based at least in part on the utterance history, and outputs the resultant word combination, and
when the processing apparatus replaces the portion of the word combination greater than or equal to a threshold number of times in the utterance history of the preservation apparatus, the setting apparatus supplements the replaced words.

2. The dialogue system of claim 1, further comprising a preservation apparatus configured to preserve therein an utterance history of utterances of the user,
wherein the processing apparatus supplements a portion of the word combination of words to obtain a modified combination, and outputs a modified combination.

3. The dialogue system of claim 1, wherein
the processing apparatus repeats processing of at least a portion of the utterance of the user to thereby determine similar words similar to words of the word combination, and
the setting apparatus newly sets the similar words.

4. The dialogue system of claim 1, wherein the words that are in impossible combination relationships to each other are combinations of predicates and objects.

5. The dialogue system of claim 1, wherein
the setting apparatus sets in advance a plurality of words that are in response-possible combination relationships to each other, and
when the object includes the word combination included in the plurality of words that are in impossible combination relationships to each other, the processing apparatus outputs a response-possible combination.

6. A dialogue method comprising:
registering in advance in a setting apparatus a plurality of words that are in impossible combination relationships to each other;
acquiring an utterance of the user, and subject the utterance to speech recognition;
acquiring recognition result of the user's utterance, and when a speech recognition result of an object included in the speech includes a word combination included in the plurality of words that are in impossible combination relationships to each other, outputting a notification to the user that processing of the object cannot be carried out; and
preserving therein an utterance history of utterances of the user, wherein
replacing at least a portion of the word combination based at least in part on the utterance history, and outputting the resultant word combination, and
if there is replacing the portion of the word combination greater than or equal to a threshold number of times in the utterance history, registering in the setting apparatus the replaced words.

7. The dialogue method of claim 6, wherein
the plurality of words which are in impossible combination relationships to each other are combinations of predicates and objects.

8. The dialogue method of claim 6, wherein registering in advance in the setting apparatus a plurality of word that are in response-possible combination relationships, and
when the object includes the word combination included in the plurality of words that are in impossible combination relationships to each other, outputting the response-possible combination.

9. The dialogue method of claim 6, further comprising:
preserving therein an utterance history of utterances of the user;
supplementing a portion of the word combination of words to obtain a modified combination; and
outputting a supplement combination.

10. The dialogue method of claim 6, further comprising:
repeating replacing at least a portion of the utterance of the user to thereby determine similar words similar to words of the word combination; and
newly setting the similar words.

11. A non-transitory computer-readable storage medium comprising a computer program that is executable by a computer used in a dialogue program, the computer program comprising instructions capable of causing the computer to execute functions of:
setting in advance a plurality of words that are in impossible combination relationships to each other;
acquiring an utterance of the user, and subject the utterance to speech recognition;
acquiring recognition result of the user's utterance; and
when a speech recognition result of an object included in the speech includes a word combination included in the plurality of words that are in impossible combination relationships to each other, outputting a notification to the user that processing of the object cannot be carried out; and
preserving therein an utterance history of utterances of the user, wherein replacing at least a portion of the word combination based at least in part on the utterance history, and outputting the resultant word combination, and if there is replacing the portion of the word combination greater than or equal to a threshold number of times in the utterance history, registering in the setting apparatus the replaced words.

12. The medium of claim 11, further comprising acquiring an utterance of the user, and subject the utterance to speech recognition.

* * * * *